United States Patent [19]

Campbell

[11] Patent Number: 4,991,651

[45] Date of Patent: Feb. 12, 1991

[54] PIPELINE PACKER FOR PLUGGING A PIPELINE AT A DESIRED LOCATION

[75] Inventor: Douglas C. Campbell, Edmonton, Canada

[73] Assignee: Dowasue Industries Ltd., Canada

[21] Appl. No.: 366,510

[22] Filed: Jun. 14, 1989

Related U.S. Application Data

[63] Continuation-in-part of Ser. No. 115,866, Nov. 2, 1987, Pat. No. 4,854,384.

[30] Foreign Application Priority Data

Apr. 7, 1987 [CA] Canada .................................. 534015

[51] Int. Cl.$^5$ ......................................... F16L 55/132
[52] U.S. Cl. ..................................... 166/122; 138/89; 138/97
[58] Field of Search ....................... 138/89, 90, 93, 97; 166/64, 120, 122, 134, 135, 153, 187, 192, 196; 73/40.5 R; 137/384; 277/166; 405/170

[56] References Cited

U.S. PATENT DOCUMENTS

| 3,107,696 | 10/1963 | Ver Nooy | 138/89 |
|---|---|---|---|
| 3,381,714 | 5/1968 | Johnson | 138/97 |
| 3,483,895 | 12/1969 | Barto | 138/97 |
| 3,593,749 | 7/1971 | Reardon | 138/97 |
| 3,746,026 | 7/1973 | Herring | 138/90 |
| 3,943,982 | 3/1976 | Lecordier | 138/89 |
| 3,978,678 | 9/1976 | Duncan et al. | 138/89 |
| 4,272,984 | 6/1981 | Bell | 73/40.5 R |
| 4,332,277 | 6/1982 | Adkins et al. | 138/89 |
| 4,352,394 | 10/1982 | Zehren | 166/106 |
| 4,422,477 | 12/1983 | Wittman et al. | 138/89 |
| 4,465,104 | 8/1984 | Wittman et al. | 138/89 |
| 4,611,658 | 9/1986 | Salerni et al. | 166/134 |
| 4,658,860 | 4/1987 | Reaux | 138/89 |

FOREIGN PATENT DOCUMENTS

| 526582 | 6/1956 | Canada . |
|---|---|---|
| 627903 | 9/1961 | Canada . |
| 904772 | 7/1972 | Canada . |
| 923052 | 3/1973 | Canada . |
| 951934 | 7/1974 | Canada . |
| 969491 | 6/1975 | Canada . |
| 1108526 | 9/1981 | Canada . |
| 1132454 | 9/1982 | Canada . |
| 1137870 | 12/1982 | Canada . |
| 1167761 | 5/1984 | Canada . |
| 0240851 | 3/1987 | European Pat. Off. . |
| 1411045 | 10/1975 | United Kingdom . |
| 1413319 | 11/1975 | United Kingdom . |
| 1460493 | 1/1977 | United Kingdom . |
| 1543767 | 4/1979 | United Kingdom . |

Primary Examiner—Bruce M. Kisliuk
Attorney, Agent, or Firm—Stevens, Davis, Miller & Mosher

[57] ABSTRACT

The pipeline packer described herein typically includes a main body adapted for propulsion through the pipeline is an axial direction. A brake shoe support assembly is located on the main body and a plurality of circumferentially spaced brake shoes capable of gripping the interior wall of the pipeline are mounted to the support assembly. Fluid pressure activated devices are associated with the brake shoe support assembly for urging the brake shoes radially outwardly into gripping engagement with the pipeline to secure the main body in a desired location in the pipeline against the pipeline pressure forces acting thereon. A pair of annular wedges are also mounted to the main body for axial movement toward each other as the fluid pressure activated device acts on the brake shoe support assembly to urge the brake shoes into gripping engagement. An annular sealing member of elastomeric material is located between the annular wedges and is adapted to co-operate with same so as to expand radially outwardly as the annular wedges move toward each other. The packer also includes fluid pressure supply and control systems connected to the fluid pressure activated devices so that on demand the brake shoes are urged into gripping relationship with the pipeline while at the same time the annular sealing member is expanded into sealing engagement with the pipeline wall.

27 Claims, 6 Drawing Sheets

PIPELINE PACKER FOR PLUGGING A PIPELINE AT A DESIRED LOCATION

CROSS-REFERENCE TO RELATED APPLICATION

This application is a continuation-in-part of my application Ser. No. 115,866 filed Nov. 2, 1987 and assigned to Dowasue Industries Ltd. (now U.S. Pat. No. 4,854,384 of Aug. 8, 1989) the disclosure of which application is incorporated herein by reference thereto.

BACKGROUND OF THE INVENTION

This invention relates to a pipeline plug or packer for plugging a pipeline, such as a crude oil pipeline, at a selected location therealong.

Pipeline packers of the type to which the present invention relates are designed to act as positionable shut-off valves inside a pipeline. The packer is typically loaded into the pipeline through a standard pig trap and the packer is transported along the pipeline by the fluid flowing in the line. Tracking of the packer is typically done from above ground with a sensor receiving signals from a transmitter located on the packer. When the packer reaches the desired position, the pipeline pumping equipment is stopped to stop the flow and the packer is activated by remote control so as to seal the pipeline at that location. With two packers spaced some distance apart, it is possible to isolate a section of the pipeline, thereby allowing that section of the pipeline to be drained to provide a substantially liquid-free environment without draining the entire line. After the desired work in the pipeline has been accomplished, the packer is released by remote control, and the flow through the pipeline is started up to move the packer along the line with the packer being thereafter removed through a further pig trap.

The pipeline packer must be capable of forming a reliable seal under a wide variety of conditions. In mountainous country, extremely high pipeline hydrostatic heads are common, typically being in the order of several hundred pounds per square inch and, in extreme cases, pressure heads as high as 700 pounds per square inch may be encountered.

SUMMARY OF THE INVENTION

It is therefore a basic object of the present invention to provide an improved pipeline packer, which packer is capable of gripping and sealing against a pipeline interior wall in a reliable fashion under high pressures.

A further general object of the invention is to provide an improved pipeline packer which is compact, capable of navigating relatively tight bends, which is reliable and self-contained, and incorporates its own source of hydraulic energy.

It is a further object of the invention to provide simple and reliable pipeline wall gripping brake shoe activating arrangements; a further object is to provide means which protect against extrusion and creep of the annular seal under the differential pressures which may be encountered during use.

A further objective is to provide an improved packer incorporating a self-contained energy supply and two-stage pressurization and depressurization.

A pipeline packer in accordance with the invention for plugging pipeline at a selected location typically includes several of the following features in suitable combination:

(1) a body assembly having an upstream high pressure end and a downstream low pressure end and adapted for insertion into and propulsion through the pipeline in the axial direction under the influence of fluid pressures acting thereon;

(2) a plurality of brake shoes capable of gripping interior wall of the pipeline mounted to said body assembly and extending thereabout in circumferentially spaced relation;

(3) said brake shoes being mounted to said body assembly for generally radial motion of each brake shoe relative to said body assembly from a non-gripping to a pipeline wall gripping position;

(4) a pair of annular wedging means mounted to said body assembly for relative axial movement therebetween;

(5) fluid pressure activated means associated with said annular wedging means for effecting said relative axial movement and to said brake shoes for moving same to the pipeline wall gripping position;

(6) an annular sealing member of elastomeric material mounted to said body assembly between said pair of annular wedging means and co-operating therewith to expand radially outwardly as relative motion of the annular wedging means toward one another occurs thereby to bring the sealing member into engagement with the interior wall of the pipeline to substantially prevent leakage of fluid around said body assembly;

(7) fluid pressure supply and control means connected to said fluid pressure activated means and adapted, on command, to cause said brake shoes to be urged radially outwardly into gripping relation with the pipeline wall and to effect said relative axial movement between said annular wedging means to expand said sealing member into sealing engagement with the pipeline wall.

Preferably, the fluid pressure activated means associated with said annular wedging means comprises first piston and cylinder means.

In a typical embodiment the fluid pressure supply and control means includes a source of fluid pressure, and valve means for controlling admission to and release of the fluid from the fluid pressure activated means.

As a further feature of the invention said fluid pressure activated means includes respective piston and cylinder means associated with each brake shoe and being mounted to said body assembly, and wherein said body assembly includes a main body section to which said brake shoes and their associated piston and cylinder means are mounted, an elongated rod mounted to said main body section and extending outwardly therefrom, said first piston and cylinder means being defined by a piston formed on said rod and a cylinder surrounding said piston and slidable relative thereto along said rod with a variable volume chamber being defined between the piston and the cylinder, one of said pair of annular wedging means being secured to said cylinder and the other one being secured relative to the main body section.

Preferably said piston is defined by an outwardly stepped portion on said rod, and said cylinder defining radially stepped portions each respectively mating with the rod and the piston formed thereon, and said variable volume chamber being an annular chamber defined by the radially stepped portions on said rod and said cylinder, said piston and cylinder being at the high pressure end of said body assembly. The cylinder is preferably of an open-ended sleeve-like configuration and the upstream high pressure end of the piston is exposed to the pressure existing, in use, in the pipeline.

Another feature of the invention provides means movable from a retracted position to an advanced position in juxtaposition to a downstream low pressure side of said elastomeric sealing member to reinforce the same and assist in preventing extrusion and creep of the sealing member under the influence of the differential axial pressures acting thereon when in use. The above-noted movable means preferably comprises circumferentially spaced radially movable plunger means adapted to move to a radially outer sealing member reinforcing position under the influence of a differential pressure acting across said sealing member when the latter is in sealed engagement with a pipeline wall. Springs or other suitable means are associated with each of said plunger means to effect retraction thereof to an inoperative position in the absence of the differential pressure.

As a further feature of the invention said body assembly has a main body section to which said brake shoes and their associated piston and cylinder means are mounted, each brake shoe being mounted to the radially outer end of a piston rod having a piston formed on a radially inner end thereof, and the fluid pressure supply and control means including passages in said body assembly to supply and release pressurized fluid to and from the interiors of the cylinder means within which said pistons are located to force the same, on command, radially outwardly to the pipeline wall gripping positions and, on command, to release said fluid from said cylinder means to allow the pistons and the brake shoes to retract.

Preferably the piston and cylinder means for the brake shoes each together define an annular zone communicating with a supply of pressurized fluid which acts on the piston in a direction such as to cause retraction thereof together with the brake shoe when the fluid pressure has been released from the interiors of the cylinder means.

As an added feature each cylinder means and its associated piston are removable from said main body section to facilitate repair and replacement thereof.

In accordance with a further feature of the invention said fluid pressure supply and control means includes a pressure intensifier means between said source and the piston and cylinder means, means for by-passing said intensifier during a first stage of the admission of the pressurized fluid to the piston and cylinder means and means to render the intensifier operative during a second stage of the admission to bring the brake shoes and the annular sealing member into the pipeline wall gripping and sealing positions respectively. The supply and control means is preferably arranged such that during said first stage, the fluid being admitted has essentially the same pressure as the pressure at said source and during said second stage the pressure of the fluid being admitted is a multiple of the source pressure.

The source of fluid pressure preferably comprises a chamber divided into two compartments by a movable partition, one of said compartments containing pressurized gas and the other containing a hydraulic liquid so that when said control means is activated, the pressurized gas forces the liquid out of the compartment and into the fluid pressure activated means for effecting said motion of the brake shoes and the annular wedging means.

In the embodiment described hereafter, the source of pressure is disposed in a first module, said control means being disposed in a second module, and said body assembly with the gripping and sealing means comprising a third module, the three modules being linked together by flexible joint means to enable the packer to travel through relatively tight bends in a pipeline.

Further features and advantages of the invention will become apparent from the following description of a preferred embodiment of same, reference being had to the accompanying drawings.

BRIEF DESCRIPTION OF THE DRAWINGS

In drawings which illustrate a preferred embodiment the invention.

DETAILED DESCRIPTION OF THE PREFERRED EMBODIMENT

Figure 1:
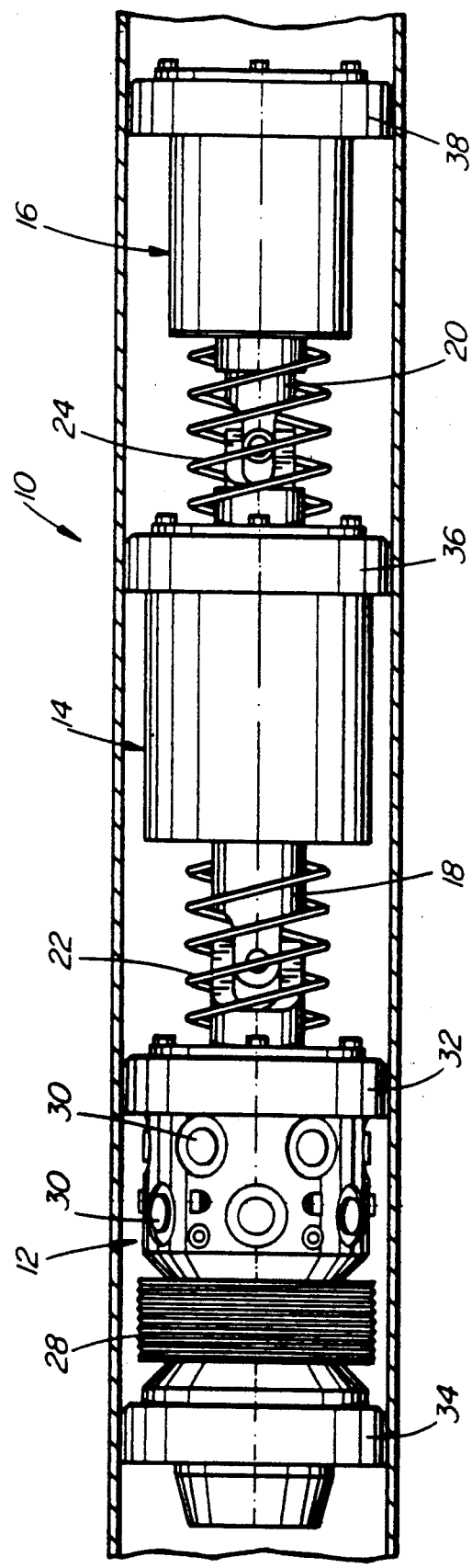
FIG. 1 is side elevation view of a packer in accordance with the present invention positioned within a pipeline.

Referring firstly to Figure the pipeline packer 10 is illustrated as being disposed within a pipeline. The packer 10 comprises three main modules 12, 14 and 16. Module 12 is the gripping and sealing module and it contains the necessary mechanisms to effect gripping and sealing of the packer within the pipeline. Module 14 contains the fluid pressure supply and control means and module 16 comprises the source or supply of pressurized hydraulic fluid.

The three modules 12, 14 and 16 are linked together by flexible universal joints 18 and 20 in a manner known per se in the prior art. Hydraulic lines 22 and 24 between the modules 12, 14 and 16 are formed as spirals thereby to allow flexing movement between the modules without overstressing the hydraulic lines.

The gripping and sealing module 12 will be described in detail hereafter but by way of a general introduction to it is noted here that sealing of the pipeline is accomplished by way of a polyurethane elastomer sealing ring 28 which is radially expanded by virtue of annular wedge rings to be described hereafter. The pipeline gripping action is effected by means of a plurality of circumferentially arranged brake shoes which are expanded radially outwardly against the interior wall of the pipeline by respective piston and cylinder means to be described hereinafter.

It will also be noted that the gripping and sealing module 12 is supported within the pipeline by front and rear annular flanges or pig rubbers 32 and 34. In like manner, the frontal ends of modules 14 and 16 are supported by annular pig rubbers 36 and 38. All of these pig rubbers are of a generally cup-shaped cross-section and they are made of a tough long wearing polyurethane elastomer material to provide for long life before there is any need for replacement.

Figure 2:
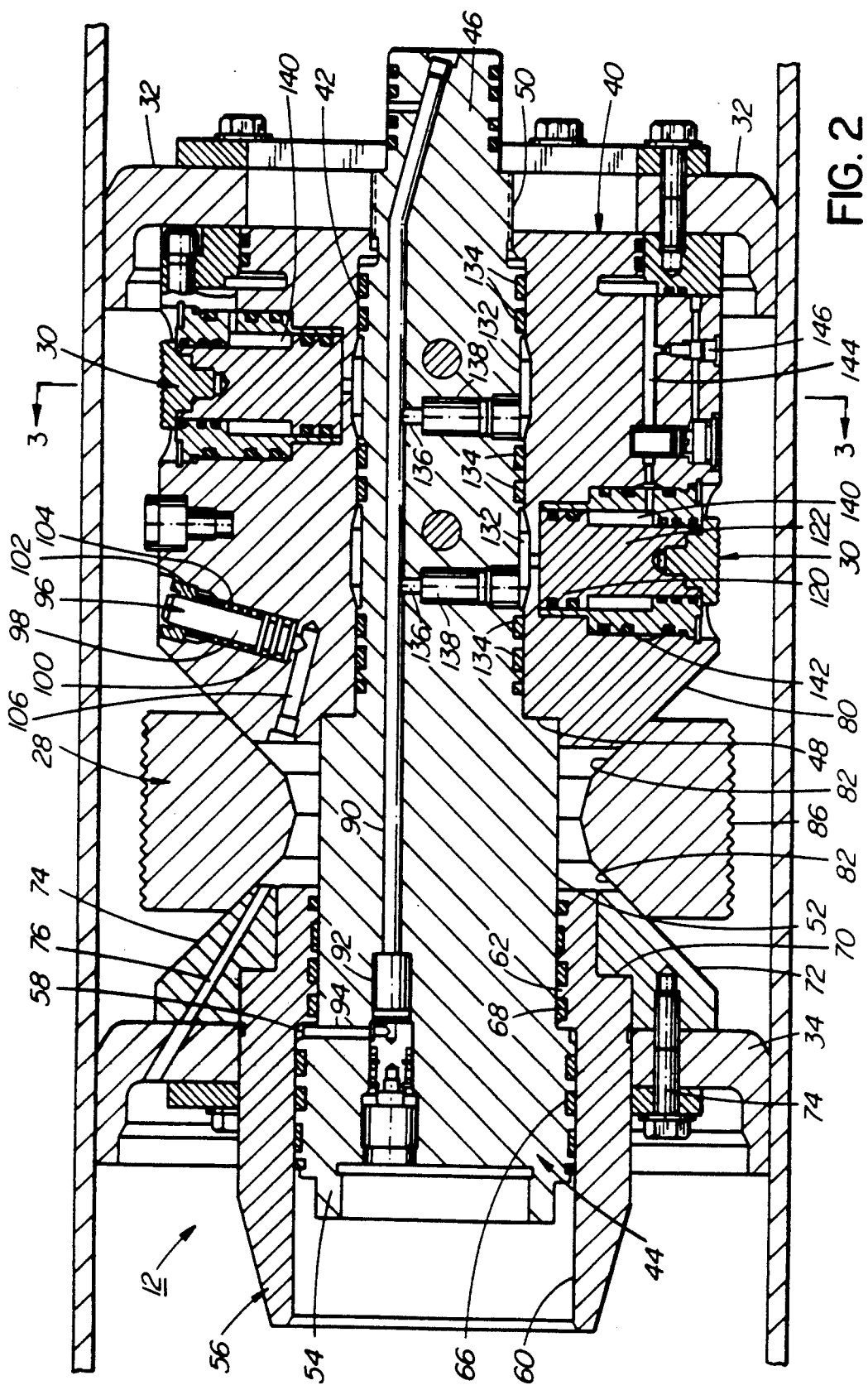
FIG. 2 is a longitudinal section view of the gripping and sealing module portion of the packer.
Figure 3:
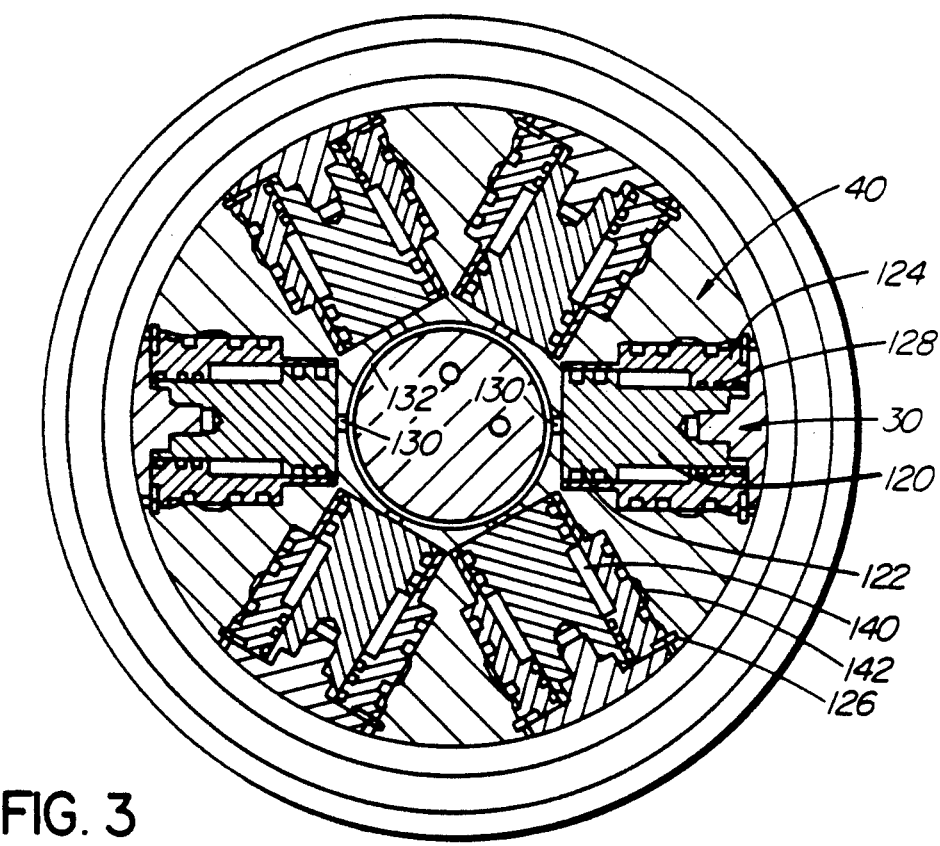
FIG. 3 is a cross-section view taken along line 3—3 in FIG. 2.
Figure 4:
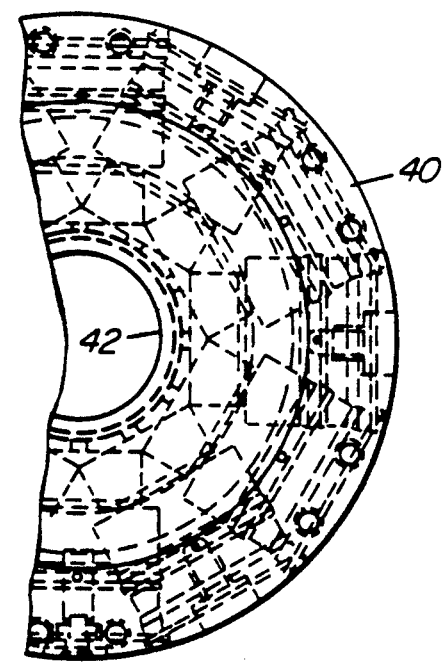
FIG. 4 is a partial end elevation view of the main body section of the packer.

Turning now to FIGS. 2-4, the gripping and sealing module 12 will be described in greater detail. As noted previously, both front and rear ends of the module 12 are provided with annular cup-shaped flanges or pig rubbers 32 and 34 which serve to slidably support the module 13 for movement along the pipeline interior while at the same time sealingly engaging the pipeline wall so that the packer may be moved along the pipeline by a flow of fluid therein. The module 12 includes a main body section 40 to which the brake shoes 30 and their associated activating piston and cylinder means are mounted. The main body section 40 is of a generally annular configuration and it includes a relatively large bore 42 extending axially thereof. An elongated rod 44 is mounted in the main body section 40 and it includes a reduced diameter neck portion 46 which is seated within the bore 42 within the main body section. The rod 44 includes outwardly stepped portions, the first one of such stepped portions 48 seating in a corresponding annular step formed in the aft end of main body section 40. The neck portion 46 is firmly retained within bore 42 by means of screw threads 50 which engage corresponding threads formed in the aft end portion of the previously noted universal joint 18. The aft end of rod 44 includes a smooth cylindrical portion 52 and, at the rear end of rod 44 there is an outwardly stepped portion defining a piston 54. A cylinder 56 surrounds the piston 54 and is slidable relative thereto along the rod 44 with a variable volume chamber 58 being defined between the piston 54 and the cylinder 56. It will of course be seen that the cylinder includes internal cylindrical walls 60 and 62, cylindrical wall 62 being stepped radially inwardly of wall 60. The piston 54 slides along cylinder wall 60 while cylinder wall 62 slides along cylindrical portion 52 of the rod 44. Multiple annular seals 66 are provided on piston 54 so as to make good sealing engagement with the cylindrical wall 60 of cylinder 56 while further seals 68 are provided on the cylindrical wall 62 of cylinder 56 thereby to make for fluid tight engagement between these components. It will accordingly be seen that the variable volume chamber 58 is an annular chamber and it is defined by and between the radially stepped portions on the rod 44 and the cylinder 56. The piston 54 and the cylinder 56 are located at the high pressure end of the overall body assembly, (the body assembly being the overall general assembly which comprises the module 12). The upstream high pressure end of the piston 54 is exposed to the pressure existing during use within the pipeline.

It will be noted that the forward end of cylinder 56 is radially inwardly stepped at 70 and that an annular wedge ring 72 is mounted thereon and firmly secured thereto by the studs 74. The annular wedging ring 72 has a frustro-conical wedging surface 74 thereon which defines a cone angle of approximately 45° relative to the longitudinal axis of the module 12. It will also noted from FIG. 2 that a pressure balancing passage 76 extends through the rear flange or pig rubber 34 and through the wedging ring 72. This passage provides a pressure balancing effect which will be noted hereinafter.

The rearward face of main body section 40 is provided with a complementary annular wedging surface 80, also having a smooth frustro-conical shape and a cone angle of approximately 45° to the axis of the module 12.

The previous noted annular sealing ring 28 is located between and seated on the annular wedging surfaces 74 and 80 and, as again shown in FIG. 2, the sealing ring is itself provided with opposed wedging surfaces 82 sloped to correspond with the annular wedging surfaces 74 and 80. Hence, as cylinder 56 moves axially forwardly along piston 54, the wedging ring 72 thereon moves toward the annular wedging surface 80 formed on the main body section 40. The interaction of the wedging surfaces with the sealing ring 28 causes the latter to be expanded radially outwardly such that the outer surface 86 of the sealing ring comes into close sealing engagement with the interior surface of the pipeline wall. This surface 86 is preferably provided with a series of narrow V-shaped grooves thereby to enhance the sealing effect. The sealing ring 28 is preferably made of a tough polyurethane elastomer having a Durometer hardness of approximately 85.

It will be noted that the rod 44 has an elongated passage 90 extending longitudinally thereof from the extreme front end of the rod through a check valve 92 and thence communicating with a transverse passage 94 formed in the piston 54. This passage 94 communicates with the annular chamber 58 formed between the radially stepped portions of the piston 54 and cylinder 56. Hence, as hydraulic fluid under pressure is supplied through the passageways 90 and 94, the cylinder 56 is caused to move forwardly along the rod 44 thus causing the annular sealing ring 28 to be expanded radially outwardly in the manner described previously. The annular seals 66 and 68 prevent leakage of hydraulic fluids between the rod 44, piston 54 and cylinder 56.

During use of the packer, it will be appreciated that substantial differential pressures are applied to the elastomeric sealing ring 28. Ordinarily, this tends to cause distortion and creep of the seal ring 28 in the axial direction. In order to alleviate this problem, a plurality of anti-extrusion plungers 96 are provided, these plungers being mounted in the rear portion of the main body section 40 just forwardly of the annular wedging surface 80. These anti-extrusion plungers 96 are disposed in circumferentially spaced apart relationship and, although only one of them is shown in FIG. 2, six equally spaced such plungers are actually provided in the embodiment being described These anti-extrusion plungers 96 include an elongated plunger shaft having a plurality of annular seals 100 at the radially inner end thereof. Escape of the plunger shaft 98 from the bore within which it is contained is prevented by means of an annular bushing 102 threaded into the outer portion of the bore. A compression spring 104 surrounds the shaft of the plunger and bears against the above-noted bushing 102 thereby urging the plunger radially inwardly. The lower end of the bore within which the plunger is mounted communicates with a passage 106 which leads into the space which exists between the rod 44 and the radially inwardly facing surface of the elastomeric seal ring 28. It was previously noted that a pressure balancing passage 76 extends through the rear flange 34 and the wedging ring 72. Hence, this annular space beneath the seal ring 28 is at the same pressure as the pressure on the upstream high pressure side of the packer. This upstream high pressure acts on the inner end of the plunger shaft and causes all of the anti-extrusion plungers 96 to be projected radially outwardly such that their outer ends come into close juxtaposition to the interior wall of the pipeline. Thus, under extreme pressure conditions, when the seal ring 28 bulges outwardly as indicated by the dashed lines, the several anti-extrusion plungers, in their extended positions, help to stabilize the sealing ring and prevent undue extrusion and distortion thereof. When the pressure differential reduces down to a fairly nominal level, the springs 104 retract the anti-extrusion plungers so that they are incapable of interfering with the movement of the packer along the pipeline.

At this point it might be noted that the main body section is also provided with a plurality of skid buttons 110, such buttons being located in circumferentially spaced relationship around the main body section. The purpose of the skid buttons is to contact the interior wall of the pipeline during passage around a tight bend or the like thereby to prevent contact of the pipeline wall with the various other components of the packer module 12 thus reducing wear and tear on such components.

The structures for activating the brake shoes 30 will now be described. It will be seen from FIGS. 2 and 3 in particular that each brake shoe is mounted to the radially outer end of a short, stout piston rod 120, such piston rod 120 having a piston 122 formed on the radially inner end thereof. The piston and piston rod are in turn slidably mounted in a cylinder sleeve 124. Each cylinder sleeve is retained within the main body section 40 by means of a retainer ring 126. A radially outer end of the cylinder sleeve is stepped inwardly and provided with seals 128 which bear against the exterior surface of piston rod 120. Piston 122 is of course also provided with suitable annular seals so that it sealingly engages the smooth inner bore provided by the cylinder sleeve 124. The exterior of the cylinder sleeve 124 is also provided with several annular seals to form a good seal with the bore of the main body section.

It will be noted from FIGS. 2 and 3 that the brake shoes 30 and their respectively associated pistons, piston rods and cylinder sleeves etc. are disposed in circumferentially spaced radially arranged relationship around the axis of the packer module 12. Two such radial arrays are provided, each array lying in a plane which is normal to the above-noted longitudinal axis of the packer module.

In order to extend the various brake shoes 30 radially outwardly, it will be noted that the radially inner end of each piston communicates via a short radial bore 130 with an annular channel 132 extending around and defined between the main body section and the neck 46 of the rod. Shallow grooves are actually formed in both the neck 46 and the main body section 40 to achieve this purpose. Leakage of pressurized fluid out of these annular channels 132 is prevented by means of multiple annular seals 134 extending around the neck 46 of the rod on opposing sides of channels 132. Each of the annular channels 132 communicates with the previously noted longitudinally extending passage 90 via lateral passageways 136, each passageway 136 being provided with a respective one way check valve 138. Hence, as fluid under pressure is applied via passage 90, such fluid enters the annular channels 132 and thence passes through the short passageways 130 leading into the individual cylinder and piston assemblies to which the respective brake shoes 30 are secured. Pressurized fluid causes the brake shoes to move radially outwardly relative to the main body section from a retracted non-gripping to an extended pipeline wall gripping position.

It might be noted here that the brake shoes, or at least that portion of same making contact with the pipeline interior wall, are made from a relatively soft malleable metal such as aluminum having a hardness preferably from about 65 to about 90 Brinell hardness units. This particular feature is described in greater detail in the previously noted application Serial No. 115,866. By providing the brake shoe contacting surface with a relatively malleable metal, damage to the pipeline wall interior surfaces is substantially prevented. This is of considerable importance to pipeline operators.

The means for effecting radial extension of the brake shoes 30 have been described. It is also of some importance to have means for positively retracting the brake shoes 30 after the pressure thereon has been released. It will have been noted during the course of the description of the piston rods 120, pistons 122 and cylinder sleeves 124, that an annular space or region is defined between the radially stepped portions of the cylinder sleeves 124 and the piston 122. This annular space is designated at 140. With reference to FIGS. 2 and 3 it will be noted that each cylinder sleeve 124 is surrounded by a shallow annular groove 142. This shallow annular groove communicates with all the other shallow annular grooves 142 by means Of drilled passageways 144 thus enabling the passageways and the annular spaces 140 to be pressurized by way of a suitable inlet 146 with a suitable pressurizing gas, preferably an inert gas such as nitrogen. The supply pressure is typically arranged to be in the order of 400–1000 psi thereby to positively retract the pistons 122 and the attached brake shoes 30 at the end of a cycle thus avoiding catching and breakage of the brake shoes on any obstructions appearing on the inside of the pipeline.

Figure 6:
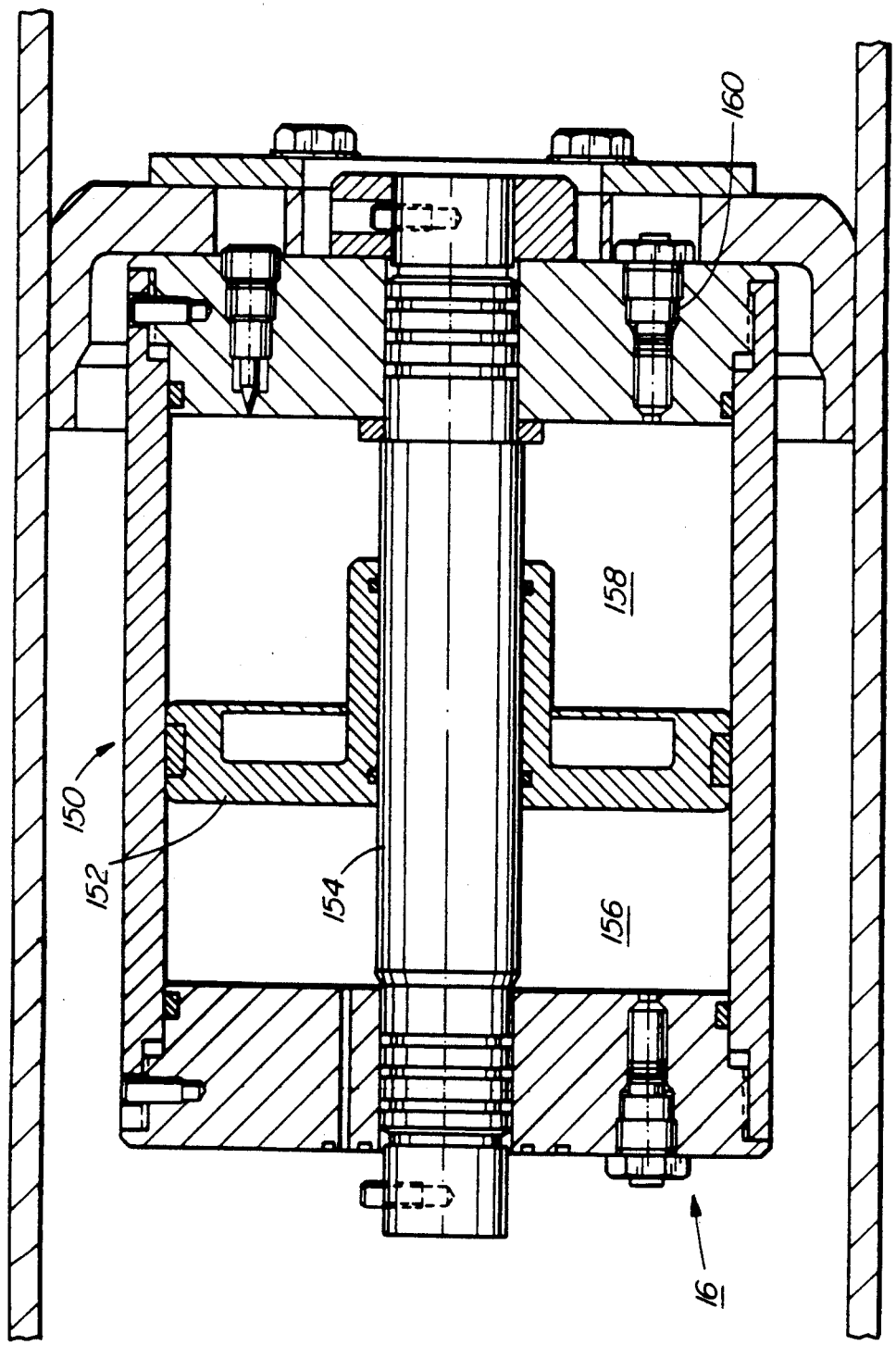
FIG. 6 is a longitudinal section view of the module which incorporates the source of fluid pressure.
Figure 7:
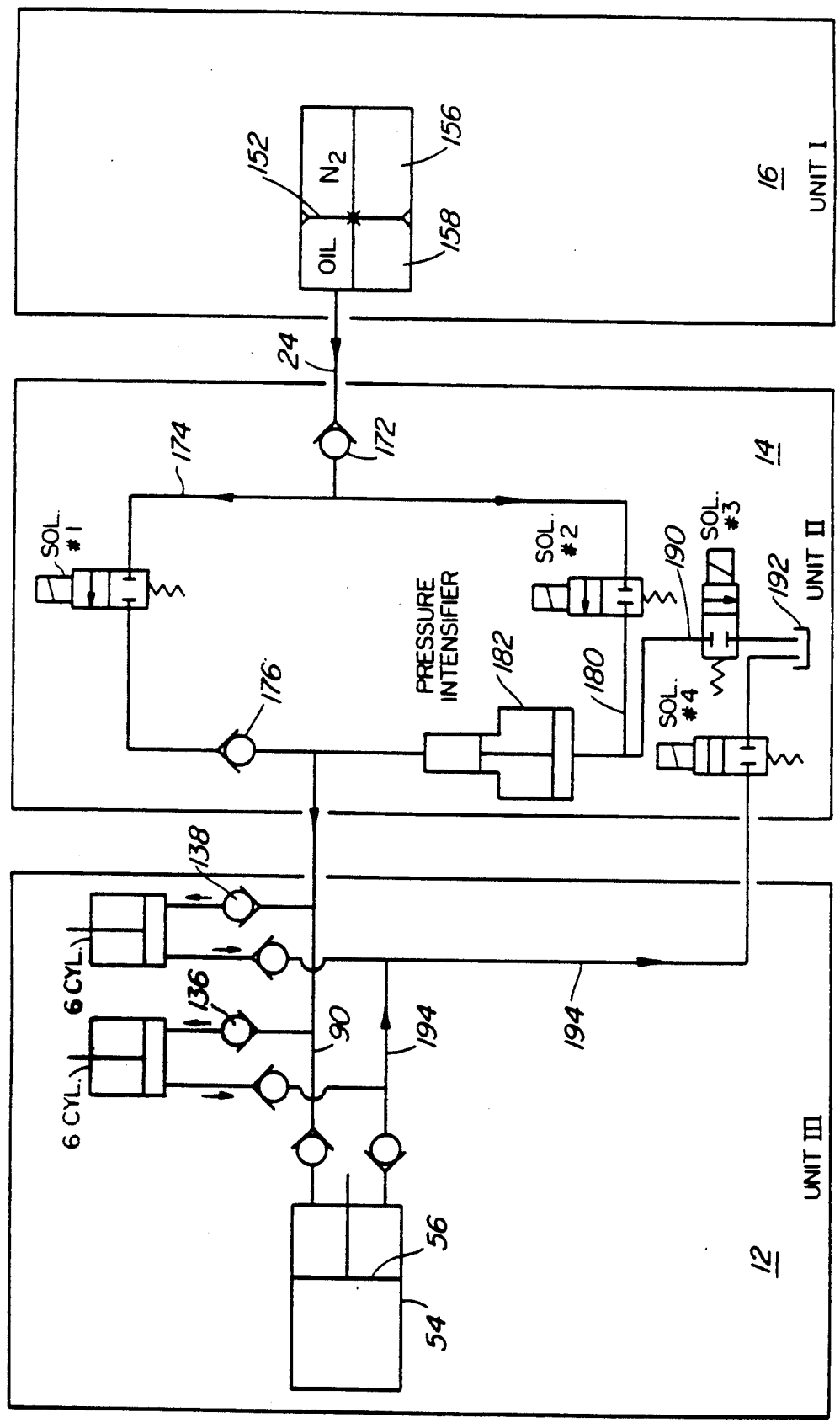
FIG. 7 is a schematic diagram of the hydraulic fluid supply and control system showing the manner in which it is connected to the various hydraulic piston cylinder assemblies.

The fluid pressure and supply means for activating and deactivating the gripping and sealing module 12 will now be described with particular reference to FIGS. 5, 6 and 7. Reference will be had firstly to FIG. 7 which is a schematic of the overall system. With reference firstly to module 16, the same comprises a pressure resistant chamber 150 having an axially movable piston 152 therein, such piston being mounted for movement along an axially extending shaft 154. The piston 152 essentially separates chamber 150 into two separate annuluar compartments 156 and 158. Compartment 156 typically contains nitrogen gas while compartment 158 contains hydraulic oil. The piston 152 is of course provided with suitable annular seals thereby to prevent leakage or blow-through of the nitrogen into the hydraulic oil. The nitrogen is provided at a pressure such that when the oil has been fully displaced outwardly of the chamber, the residual pressure of the nitrogen is still in the order of 2000 psi. Suitable inlet check valve means 160 are for recharging the nitrogen supply.

The pressurized oil from module 16 passes through the previously noted spiral hydraulic line 24 through a one-way check valve and into the module 14. Module 14 is the control center for the packer. This module contains a number of drilled passageways for the hydraulic oil with suitable solenoid valves and check valves being provided together with a pressure intensifier thereby to achieve the desired final result.

Figure 5:
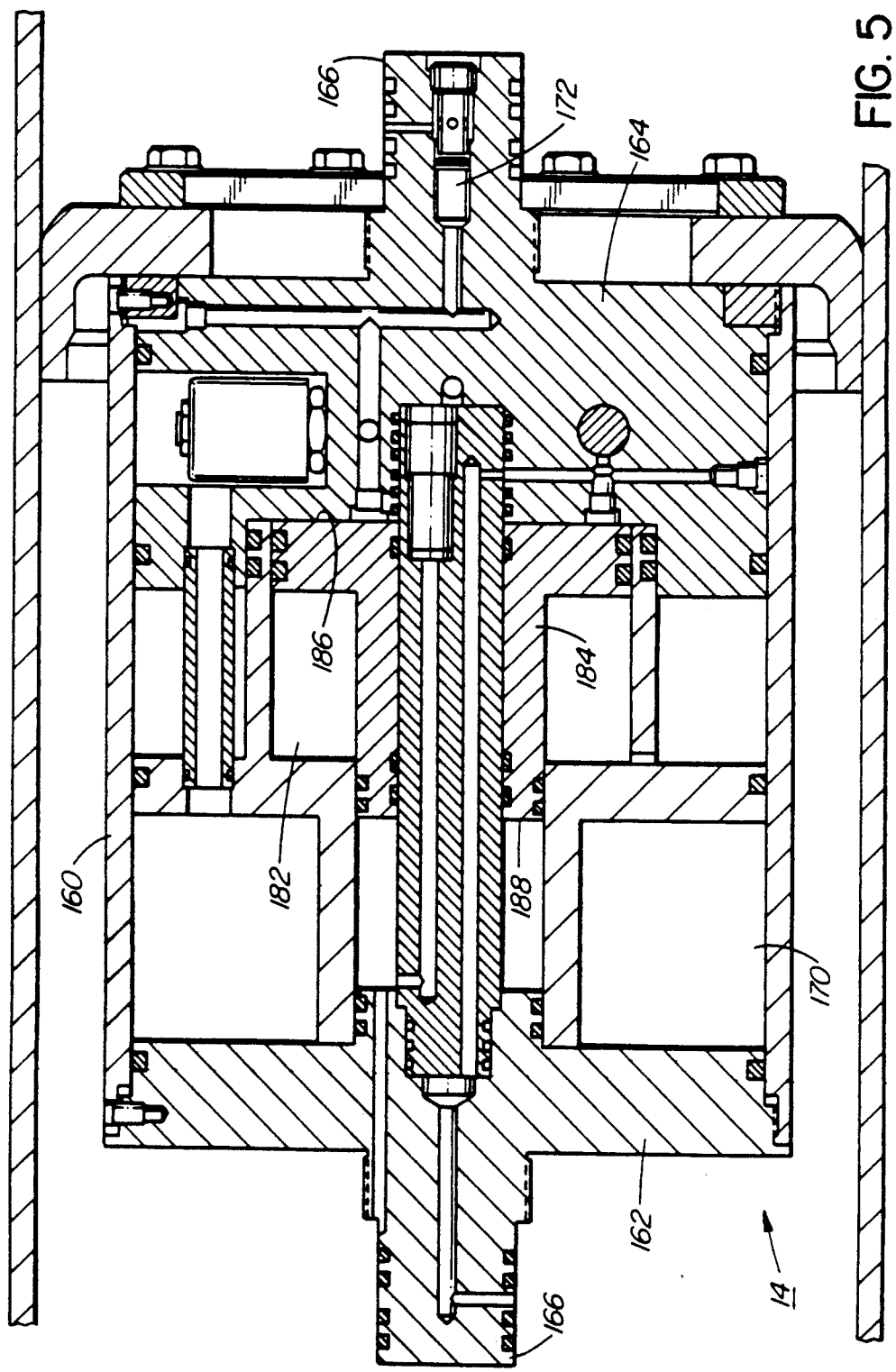
FIG. 5 is a longitudinal section view of the module which contains the fluid pressure supply and control means including the pressure intensifier.

Referring firstly to FIG. 5, the control module includes a cylindrical casing 160, such casing being provided with machined metal end pieces 162 and 164, such end pieces having outwardly projecting neck portions 166 for connection to the previously noted universal joints 18 and 20 which serve to connect the three modules together and which at the same time provide for transmission of the pressurized hydraulic fluid. Suitable annular seals on neck portions 166 prevent any leakage of the high pressure fluids. Module 14 includes a region within which is packaged the electronic control module broadly designated by reference 170. The electronic control module includes main and backup batteries and a circuit board including means for receiving remote signals (techniques which in themselves are well known in the art) with the circuit board incorporating suitable circuitry so as to activate or deactivate the four solenoid valves which are to be referred to hereinafter.

Referring again to FIG. 7 it will be seen that the incoming hydraulic oil from module 16 passes through a one-way check valve 172. The drilled passageways in module 14 include a first passageway 174 which passes through a first solenoid valve (Sol.1). Line 174 continues on through a further one-way check valve 176 and then connects with an output line 178 which communicates via spiral hydraulic line 22 with the gripping and sealing module 12.

Returning back to check valve 172, another branch of the hydraulic line designated by reference 180 passes through a second solenoid valve (Sol.2) and thence such line 180 leads into the inlet or low pressure end of a pressure intensifier 182. Pressure intensifiers are, per se, well known in the art. As illustrated in FIG. 5, the pressure intensifier includes an axially movable piston 184 defining a relatively large piston area 186 at the one end thereof and a relatively small piston area 188 at the opposing end. As is well known, the ratios of these two areas determine the degree of pressure multiplication. Since in this case it is desired to increase the applied pressure from about 2000 psi to about 10,000 psi, it is quite apparent that piston area 186 must be about five times greater than piston area 188.

It is also noted here that hydraulic passage 180 is also connected via a branch line 190 to and through a third solenoid valve (Sol.3). The outlet of this valve in turn leads to a return tank 192, the function of which is to accept the hydraulic fluid at the end of a cycle, which fluid was originally present in module 12.

The various passages for supplying pressurized hydraulic fluid to piston 54 and cylinder 56 for expanding the sealing ring 28 and for supplying pressurized fluid to the several piston and cylinder assemblies for effecting radial expansion of the brake shoes 30 were previously described. The passageways for releasing the hydraulic fluid from these components are not shown in FIG. 2 although they are schematically illustrated in FIG. 7. Specifically, hydraulic line 194, together with its associated branch lines and check valves, serves to exhaust the several pressure activated piston and cylinder assemblies thereby to permit radial contraction of the sealing ring 28 and inward radial retraction of the brake shoes 30 upon completion of a cycle. The hydraulic fluid which is displaced as a result of this action passes along passageway 194 and thence through a fourth cylinder valve (Sol.4), with the spent hydraulic fluid returning to the previously noted return tank 192.

In the operation of the packer, it will be assumed that the complete packer has been moved along within a pipeline by virtue Of the flow therein until it has reached a preselected location. A signal is then transmitted in any suitable manner to the electronic control module 170. As a result of this signal, Sol. 1 opens to allow pressurized hydraulic fluid to flow from module 16 outwardly through line 24, check valve 172, passageway 174 and check valve 176 and then outwardly through passage 178 and hydraulic line 22 into the sealing and gripping module 12. The pressurized hydraulic fluid enters the passage 90 and thence forces its way into the annular chamber 58 defined between the radially stepped portions of cylinder 56 and piston 54 with the result being that the annular wedging surface 74 moves toward wedging surface 80 thus causing the seal ring to be expanded radially outwardly into sealing engagement with the inner wall of the pipeline. At about the same time the two radial disposed arrays of brake shoes 30 (and their associated pistons and piston rods) move radially outwardly into contact with the interior wall of the pipeline. This action serves to initially "set" the sealing and gripping module 12 at a hydraulic oil pressure in the order of 2000–2500 psi.

The control modules to close Sol.1. Then Sol.2 is opened to allow the pressurized oil entry into the large end of the pressure intensifier 182 which, in a typical case, acts to multiply the pressure some five times up to a pressure of approximately 10,000 psi. A pressure sensing switch (not shown) can be utilized to sense when this pressure is reached following which Sol. 2 closes. As a result of this final pressurizing action, the brake shoes 30 firmly grip the inside wall of the pipeline and the resilient sealing ring firmly seals against liquid bypass. The anti-extrusion plungers 96, by virtue of the pressure differential arising, project radially outwardly for the purposes previously described.

In order to release the packer after the packer has served its purpose, the control module opens Sol. 3 to allow the hydraulic fluid to flow from the large end of the pressure intensifier 182 back into the return tank 192. This reduces the pressure in the system from 10,000 to 2000 psi. Sol. 3 then closes following which Sol. 4 opens to allow the hydraulic fluid to flow from module 12 thus reducing the hydraulic pressure from 2000 pounds down to substantially atmospheric pressure. The pressurized nitrogen in the several piston assemblies causes retraction of the brake shoes 30 and the strong contraction of the annular sealing ring 28 forces the annular wedging surface 74 away from annular wedging surface 80 thus returning module 12 essentially to its initial condition. Sol.4 then closes. As the packer has then completed a full cycle of operation it will be subsequently removed from the pipeline, inspected, and the hydraulic oil drained from the return tank and module 16 replenished with fresh hydraulic oil and a supply of pressurized nitrogen.

While a preferred embodiment of the invention has been described by way of example, those skilled in the art will realize that various changes and modifications may be made while still remaining within the spirit and scope of the invention. For example, many of the features of the invention are applicable to the pipeline packer as described in the above-noted application Serial No. 115,866 which incorporates dual wedge-action activated brake shoes as opposed to the fluid pressure piston and cylinder activated brake shoe system disclosed herein. For definitions of the invention reference is to be had to the appended claims.

I claim:

1. A pipeline packer for plugging a pipeline at a selected location therein, comprising:
    (a) a body assembly having an upstream high pressure end and a downstream low pressure end and adapted for insertion into and propulsion through the pipeline in the axial direction under the influence of fluid pressures acting thereon;
(b) a plurality of brake shoes capable of gripping the interior wall of the pipeline mounted to said body assembly and extending thereabout in circumferentially spaced relation;
(c) said brake shoes being mounted to said body assembly for generally radial motion of each brake shoe relative to said body assembly from a nongripping to a pipeline wall gripping position;
(d) a pair of annular wedging means mounted to said body assembly for relative axial movement therebetween;
(e) fluid pressure activated means associated with said annular wedging means for effecting said relative axial movement and with said brake shoes for moving same to the pipeline wall gripping position;
(f) an annular sealing member of elastomeric material mounted to said body assembly between said pair of annular wedging means and co-operating therewith to expand radially outwardly as relative motion of the annular wedging means toward one another occurs thereby to bring the sealing member into engagement with the interior wall of the pipeline to substantially prevent leakage of fluid around said body assembly;
(g) fluid pressure supply and control means connected to said fluid pressure activated means and adapted, to command, to cause said brake shoes to be urged generally radially outwardly into gripping relation with the pipeline wall and to effect said relative axial movement between said annular wedging means to expand said sealing member into sealing engagement with the pipeline wall;
(h) said fluid pressure supply and control means including a source of fluid pressure, and valve means for controlling admission to and release of the fluid from the fluid pressure activated means, and wherein
(i) said fluid pressure supply and control means includes a pressure intensifier means between said source and the fluid pressure activated means, means for by-passing said intensifier during a first stage of the admission of the pressurized fluid to the fluid pressure activated means and means to render the intensifier operative during a second stage of the admission to bring the brake shoes and the annular sealing member into the pipeline wall gripping and sealing positions respectively.

2. The pipeline packer of claim 1 wherein the fluid pressure activated means associated with said annular wedging means comprises first piston and cylinder means.

3. The pipeline packer of claim 1 wherein said supply and control means is arranged such that during said first stage, the fluid being admitted has essentially the same pressure as the pressure at said source and during said second state and pressure of the fluid being admitted is a multiple of the source pressure.

4. The pipeline packer of claim 4 wherein said source is disposed in a first module, said control means being disposed in a second module, and said body assembly comprising a third module, the three modules being linked together by flexible joint means to enable the packer to travel through relatively tight bends in a pipeline.

5. The pipeline packer of claim 1 wherein said fluid pressure activated means includes respective piston and cylinder means associated with each brake shoe and mounted to said body assembly, and wherein said body assembly includes a main body section to which said brake shoes and their respective piston and cylinder means are mounted, an elongated rod mounted to said main body section and extending outwardly therefrom, said first piston and cylinder means being defined by a piston formed on said rod and a cylinder surrounding said piston and slidable relative thereto along said rod with a variable volume chamber being defined between the piston and the cylinder, one of said pair of annular wedging means being secured to said cylinder and the other one being secured relative to the main body section.

6. The pipeline packer of claim 5 wherein said last mentioned piston is defined by an outwardly stepped portion on said rod, and said cylinder defining radially stepped portions each respectively mating with the rod and the piston formed thereon, and said variable volume chamber being an annular chamber defined by the radially stepped portions on said rod and said cylinder, said piston and cylinder being at the high pressure end of said body assembly.

7. The pipeline packer of claim 6 wherein said cylinder is of an open-ended sleeve-1 configuration and the upstream high pressure end of the piston is exposed to the pressure existing, in use, in the pipeline.

8. A pipeline packer for plugging a pipeline at a selected location therein, comprising:
(a) a body assembly having an upstream high pressure end and a downstream low pressure end and adapted for insertion into and propulsion through the pipeline in the axial direction under the influence of fluid pressure acting thereon;
(b) a plurality of brake shoes capable of gripping the interior wall of the pipeline mounted to said body assembly and extending thereabout in circumferentially spaced relation;
(c) said brake shoes being mounted to said body assembly for generally radial motion of each brake shoe relative to said body assembly from a nongripping to a pipeline wall gripping position;
(d) a pair of annular wedging means mounted to said body assembly for relative axial movement therebetween;
(e) fluid pressure activated means associated with said annular wedging means for effecting said relative axial movement and with said brake shoes for moving same to the pipeline wall gripping position;
(f) an annular sealing member of elastomeric material mounted to said body assembly between said pair of annular wedging means and co-operating therewith to expand radially outwardly as relative motion of the annular wedging means toward one another occurs thereby to bring the sealing member into engagement with the interior wall of the pipeline to substantially prevent leakage of fluid around said body assembly;
(g) fluid pressure supply and control means connected to said fluid pressure activated means and adapted, on command, to cause said brake shoes to be urged generally radially outwardly into gripping relation with the pipeline wall and to effect said relative axial movement between said annular wedging means to expand said sealing member into sealing engagement with the pipeline wall;
(h) said fluid pressure supply and control means including a source of fluid pressure, and valve means for controlling admission to and release of the fluid from the fluid pressure activated means, and wherein (i) said source of fluid pressure comprises a chamber divided into two compartments by a movable partition, one of said compartments containing pressurized gas and the other containing a hydraulic liquid so that when said control means is activated, the pressurized gas forces the liquid out of the compartment and into the fluid pressure activated means for effecting said motion of the brake shoes and the annular wedging means.

9. The pipeline packer of claim 8 wherein said source is disposed in a first module, said control means being disposed in a second module, and said body assembly comprising a third module, the three modules being linked together by flexible joint means to enable the packer to travel through relatively tight bends in a pipeline.

10. The pipeline packer of claim 8 wherein said fluid pressure activated means includes respective piston and cylinder means associated with each said brake shoe and being mounted to said body assembly, and wherein said body assembly has a main body section to which said brake shoes and their respective piston and cylinder means are mounted, each brake shoe being mounted to the radially outer end of a piston rod having a piston formed on a radially inner end thereof, and the fluid pressure supply and control means including passages in said body assembly to supply and release pressurized fluid to and from the interiors of the cylinder means within which said pistons are located to force the same, on command, radially outwardly to the pipeline wall gripping positions and, on command, to release said fluid from said cylinder means to allow the pistons and the brake shoes mounted thereon to retract.

11. The pipeline packer of claim 10 wherein the respective piston and cylinder means for the brake shoes each together define an annular zone communicating with a supply of pressurized fluid which acts on the piston in a direction such as to cause retraction thereof together with the break show when the fluid pressure has been released from the interiors of the cylinder means. respective piston and cylinder means for the brake shoes each together define an annular zone communicating with a supply of pressurized fluid which acts on the piston in a direction such as to cause retraction thereof together with the brake shoe when the fluid pressure has been released from the interiors of the cylindler means.

12. The pipeline packer of claim 10 wherein each cylinder means and its associated piston and piston rod are removable from said main body section to facilitate repair and replacement thereof.

13. A pipeline packer for plugging a pipeline at a selected location therein, comprising:
(a) a body assembly having an upstream high pressure end and a downstream low pressure end and adapted to insertion into and propulsion through the pipeline in the axial direction under the influence of fluid pressures acting thereon;
(b) a plurality of brake shoes capable of gripping the interior wall of the pipeline mounted to said body assembly and extending thereabout in circumferentially spaced relation;
(c) said brake shoes being mounted to said body assembly for generally radial motion of each brake show relative to said body assembly from a non-gripping to a pipeline wall gripping position;
(d) a pair of annular wedging means mounted to said body assembly for relative axial movement therebetween;
(e) fluid pressure activated means associated with said annular wedging means for effecting said relative axial movement and with said brake shoes for moving same to the pipeline wall gripping position;
(f) an annular sealing member of elastomeric material mounted to said body assembly between said pair of annular wedging means and co-operating therewith to expand radially outwardly as relative motion of the annular wedging means toward one another occurs thereby to bring the sealing member into engagement with the interior wall of the pipeline to substantially prevent leakage of fluid around said body assembly;
(g) fluid pressure supply and control means connected to said fluid pressure activated means and adapted, on command, to cause said brake shoes to be urged generally radially outwardly into gripping relation with the pipeline wall and to effect said relative axial movement between said annular wedging means to expand said sealing member into sealing engagement with the pipeline wall;
(h) means movable from a retracted position to an advanced position in juxtaposition to a downstream low pressure side of said elastomeric sealing member to reinforce the same and assist in preventing extrusion and creep of the sealing member under the influence of the differential axial pressures acting thereon when in use, and wherein
(i) said movable means comprises circumferentially spaced generally radially movable plunger means adapted to move to a radially outer sealing member reinforcing position under the influence of a differential pressure acting across said sealing member when the latter is in sealed engagement with a pipeline wall.

14. The pipeline packer of claim 13 wherein springs are associated with each of said plunger means to effect retraction thereof to an inoperative position in the absence of the differential pressure.

15. A pipeline packer for plugging a pipeline at a selected location therein, comprising:
(a) a body assembly having an upstream high pressure end and a downstream low pressure end and adapted for insertion into and propulsion through the pipeline in the axial direction under the influence of fluid pressures acting thereon;
(b) a plurality of brake shoes capable of gripping the interior wall of the pipeline mounted to said body assembly and extending thereabout in circumferentially spaced relation;
(c) a pair of annular wedging means mounted to said body assembly for relative axial movement therebetween;
(d) an annular sealing member of elastomeric material mounted to said body assembly between said pair of annular wedging means and co-operating therewith to expand radially outwardly as relative motion of the annular wedging means toward one another occurs thereby to bring the sealing member into engagement with the interior wall of the pipeline to substantially prevent leakage of fluid around said body assembly;

(e) means movable from a retracted position to an advanced position in juxtaposition to a downstream low pressure side of said elastomeric sealing member to reinforce the same and assist in preventing extrusion and creep of the sealing member under the influence of the differential axial pressures acting thereon when in use, and wherein said movable means comprises circumferentially spaced radially movable plunger means adapted to move to a radially outer sealing member reinforcing position under the influence of a differential pressure acting across said sealing member when the latter is in sealed engagement with a pipeline wall.

16. The pipeline packer of claim 15 springs are associated with each of said plunger means to effect retraction thereof to an inoperative position in the absence of the differential pressure.

17. A pipeline packer for plugging a pipeline at a selected location therein, comprising:
   (a) a body assembly having an upstream high pressure end and a downstream low pressure end and adapted for insertion into and propulsion through the pipeline in the axial direction under the influence of fluid pressures acting thereon;
   (b) fluid pressure activated gripping and sealing means for gripping the pipeline interior wall and effecting a seal thereagainst to fix the packer at the selected location and prevent fluid leakage thereabout respectively;
   (c) fluid pressure supply and control means connected to said fluid pressure activated gripping and sealing means and adapted, on command, to cause the gripping and sealing means to be activated, said supply and control means including a source of pressurized fluid and a pressure intensifier between said source and said fluid pressure activated means, first means for bypassing said intensifier during a first stage of the admission of the pressurized fluid, and second means to render the intensifier operative during a second stage of the admission to increase the fluid pressure to a desired final level to effect said gripping and sealing against the pipeline wall.

18. The pipeline packer of claim 17 wherein said supply and control means is arranged such that during said first stage, the fluid being admitted has essentially the same pressure as the pressure at said source and during said second stage the pressure of the fluid being admitted is a multiple of the source pressure.

19. The pipeline packer of claim 18 wherein said supply and control means has third means arranged such that during depressurization of the fluid pressure activated means said intensifier acts to reduce the pressure of the fluid to a selected intermediate value, and fourth means by passing said intensifier to complete the depressurization of the fluid pressure activated means.

20. The pipeline packer of claim 19 wherein said first, second, third and fourth means comprise solenoid valve means.

21. A pipeline packer for plugging a pipeline at a selected location therein, comprising:
   (a) a body assembly having an upstream high pressure end and a downstream low pressure end and adapted for insertion into all propulsion through the pipeline in the axial direction under the influence of fluid pressures acting thereon;
   (b) a plurality of brake shoes capable of gripping the interior wall of the pipeline mounted to said body assembly and extending thereabout in circumferentially spaced relation;
   (c) a pair of annular wedging means mounted to said body assembly for relative axial movement therebetween;
   (d) fluid pressure activated means associated with said annular wedging means for effecting said relative axial movement;
   (e) an annular sealing member of elastomeric material mounted to said body assembly between said pair of annular wedging means and co-operating therewith to expand radially outwardly as relative motion of the annular wedging means toward one another occurs thereby to bring the sealing member into engagement with the interior wall of the pipeline to substantially prevent leakage of fluid around said body assembly;
   (f) the fluid pressure activated means associated with said annular wedging means comprising piston and cylinder means;
   (g) the body assembly including a main body section to which said brake shoes are mounted;
   (h) an elongated rod mounted to said main body section and extending outwardly therefrom, said piston and cylinder means being defined by a piston formed on said rod and a cylinder surrounding said piston and slidable relative thereto along said rod with a variable volume chamber being defined between the piston and the cylinder, one of said pair of annular wedging means being secured to said cylinder and the other one being secured to the main body section, wherein
   (i) said piston is defined by an outwardly stepped portion on said rod, and said cylinder defining radially stepped portions each respectively mating with the rod and the piston formed thereon, and said variable volume chamber being an annular chamber defined by and between the radially stepped portions on said rod and said cylinder, said piston and cylinder being at the high pressure end of said body assembly.

22. The pipeline packer of claim 21 wherein said cylinder is of an open-ended sleeve-like configuration and the upstream high pressure end of the piston is exposed to the pressure existing, in use, in the pipeline.

23. The pipeline packer of claim 21 including means movable from a retracted position to an advanced position in juxtaposition to a downstream low pressure side of said elastomeric sealing member to reinforce the same and assist in preventing extrusion and creep of the sealing member under the influence of the differential axial pressures acting thereon when in use.

24. The pipeline packer of claim 23 wherein said movable means comprises circumferentially spaced radially movable plunger means adapted to move to a radially outer sealing member reinforcing position under the influence of a differential pressure acting across said sealing member when the latter is in sealed engagement with a pipeline wall.

25. A pipeline packer for plugging a pipeline at a selected location therein, comprising:
   (a) a body assembly having an upstream high pressure end and a downstream low pressure end and adapted for insertion into and propulsion through the pipeline in the axial direction under the influence of fluid pressures acting thereon;
   (b) a plurality of brake shoes capable of gripping the interior wall of the pipeline mounted to said body assembly and extending thereabout in circumferentially spaced relation;

(c) each of said brake shoes having a respective fluid pressure activated piston and cylinder means associated therewith and mounted to said body assembly for effecting generally radial motion of each brake shoe relative to said body assembly from a non-gripping to a pipeline wall gripping position;

(d) wherein said body assembly has a main body section to which said brake shoes and their associated piston and cylinder means are mounted, each brake shoe being mounted to the radially outer end of a piston rod having piston formed on a radially inner end thereof, (e) fluid pressure supply and control means including passages in said body assembly to supply and release pressurized fluid to and from the interiors of the cylinder means within which said pistons are located to force the same, on command, radially outwardly to the pipeline wall gripping positions and, on command, to release said fluid from said cylinder means to allow the pistons and the brake shoes to retract.

26. The pipeline packer of claim 25 wherein the piston and cylinder means for the brake shoes each together define an annular zone communicating with a supply of pressurized fluid which acts on the piston in a direction such as to cause retraction thereof together with the brake shoe when the fluid pressure has been released from the interiors of the cylinder means.

27. The pipeline packer of claim 26 wherein each cylinder means and its associated piston are removable from said main body section to facilitate repair and replacement thereof.

* * * * *